US012600179B2

(12) United States Patent
Catanet et al.

(10) Patent No.: US 12,600,179 B2
(45) Date of Patent: Apr. 14, 2026

(54) METHOD OF DETERMINING A LEFT-OR-RIGHT SIDE INSTALLATION POSITION OF A TRAILER WHEEL

(71) Applicant: Continental Automotive Technologies GmbH, Hannover (DE)

(72) Inventors: Radu Catanet, Timisoara (RO); Andrei-Stefan Cimponeriu, Giroc (RO)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 226 days.

(21) Appl. No.: 18/249,066

(22) PCT Filed: Oct. 4, 2021

(86) PCT No.: PCT/EP2021/077208
§ 371 (c)(1),
(2) Date: Apr. 14, 2023

(87) PCT Pub. No.: WO2022/078783
PCT Pub. Date: Apr. 21, 2022

(65) Prior Publication Data
US 2023/0382167 A1 Nov. 30, 2023

(30) Foreign Application Priority Data
Oct. 14, 2020 (EP) ..................................... 20465570

(51) Int. Cl.
*B60C 23/04* (2006.01)
*B60C 23/00* (2006.01)
*B62D 15/02* (2006.01)

(52) U.S. Cl.
CPC ........ *B60C 23/0416* (2013.01); *B60C 23/009* (2013.01); *B60C 23/0488* (2013.01); *B60C 23/0489* (2013.01); *B62D 15/024* (2013.01)

(58) Field of Classification Search
None
See application file for complete search history.

(56) References Cited

U.S. PATENT DOCUMENTS 5,602,524 A 2/1997 Mock et al.
8,204,645 B2 6/2012 Weston
(Continued)

FOREIGN PATENT DOCUMENTS

CN 110789279 A 2/2020
EP 0626911 B1 11/1995
(Continued)

OTHER PUBLICATIONS

European Search Report dated May 10, 2021 for the European Patent Application No. 20465570.8.
(Continued)

*Primary Examiner* — Jennifer M Anda
(74) *Attorney, Agent, or Firm* — Buchanan Ingersoll & Rooney PC

(57) ABSTRACT

A method of determining a left or right side installation position of a trailer wheel of a trailer connected to a tow vehicle. A number of rotations of the trailer wheel is determined. A number of rotations of a left side tow vehicle wheel and a right side tow vehicle wheel is determined. A first correspondence value between the number of rotations of the trailer wheel and the number of rotations of the left side tow vehicle wheel is determined. A second correspondence value between the number of rotations of the trailer wheel and the number of rotations of the right side tow vehicle wheel is determined. A left side or right side instal-
(Continued)

lation position of the trailer wheel is determined based on the first correspondence value and the second correspondence value.

11 Claims, 6 Drawing Sheets

(56)                    References Cited

U.S. PATENT DOCUMENTS

| 8,744,692 | B2 | 6/2014 | Carresjo | |
| 9,555,671 | B2 | 1/2017 | Fink | |
| 10,046,608 | B2 | 8/2018 | Haas | |
| 2007/0102996 | A1* | 5/2007 | Kelly | B60T 13/745 |
| | | | | 303/3 |
| 2008/0015764 | A1* | 1/2008 | Watanabe | B60W 50/0205 |
| | | | | 701/72 |
| 2010/0063669 | A1 | 3/2010 | Fink | |
| 2012/0259507 | A1* | 10/2012 | Fink | B60C 23/0416 |
| | | | | 701/32.7 |
| 2014/0195107 | A1 | 7/2014 | Park | |
| 2016/0129736 | A1* | 5/2016 | Peine | G01B 7/30 |
| | | | | 701/32.3 |
| 2016/0318356 | A1* | 11/2016 | McMillen | B60T 8/1725 |
| 2019/0023086 | A1* | 1/2019 | Peine | B60C 19/00 |
| 2019/0111741 | A1 | 4/2019 | Moreau | |
| 2021/0046789 | A1* | 2/2021 | Engl | B60C 23/0416 |
| 2021/0394758 | A1* | 12/2021 | Sung | B60W 40/10 |
| 2022/0055644 | A1* | 2/2022 | Li | B60W 40/114 |

FOREIGN PATENT DOCUMENTS

| EP | | 2516182 | B1 | 10/2013 | |
| WO | WO-2008156447 | A1 | * | 12/2008 | B60C 23/009 |

OTHER PUBLICATIONS

The International Search Report and the Written Opinion of the International Searching Authority mailed on Jan. 20, 2022 for the counterpart PCT Application No. PCT/EP2021/077208.

* cited by examiner

METHOD OF DETERMINING A LEFT-OR-RIGHT SIDE INSTALLATION POSITION OF A TRAILER WHEEL

CROSS-REFERENCE TO RELATED APPLICATIONS

The present application is a National Stage Application under 35 U.S.C. § 371 of International Patent Application No. PCT/EP2021/077208 filed on Oct. 4, 2021, and claims priority from European Patent Application No. 20465570.8 filed on Oct. 14, 2020, in the European Patent Office, the disclosures of which are herein incorporated by reference in their entireties.

BACKGROUND

1. Field

Embodiments of the present application relate to a method of determining a left-or-right side installation position of a trailer wheel of a trailer, and corresponding apparatus.

2. Description of Related Art

Usually, such trailers are connected to a tow vehicle or a prime mover of a so-called trailer-tow vehicle-truck.

Modern vehicles and recently also trailers are equipped with wheel electronics installed in the trailer wheel. This wheel electronics measure wheel-specific data (e.g. tire pressure, tire temperature, wheel load, etc.) and transmit this data to a reception device located in the tow vehicle.

One problem with such kind of data transfer is, however, the association of the transmitted data of the trailer wheel with the initially unknown installation position of trailer wheel. Although wheel electronics are able to transmit an identifier which is unique for the wheel electronics of a specific wheel, as described e.g. in EP 626 911 B1, this identifier does not reveal at what location said wheel is actually installed.

There is a possibility of localizing an installation position of a vehicle wheel using ABS- or ESC-sensors connected to the vehicle wheel, as described, e.g. in EP 2516182 B1. However, trailer wheels usually don't have ABS- or ESC-sensors installed.

SUMMARY

Aspects of the present application provide a method of reliably localizing a left-or-right side installation position of a trailer wheel that is not connected to an ABS- or ESC-sensors.

According to an aspect of an embodiment, there is provided a method of determining a left-or-right side installation position of a trailer wheel of a trailer. The trailer is connected to a tow vehicle or prime mover of a so-called trailer-tow vehicle-truck. The method comprises the steps of: within a predefined time interval, determining a number of complete rotations of the trailer wheel using an acceleration sensor of the trailer wheel; within the same predefined time interval, determining a number of complete rotations of a left side tow vehicle wheel of the tow vehicle using an ABS-sensor or ESC-sensor of the left side tow vehicle wheel; within the same predefined time interval, determining a number of complete rotations of a right side tow vehicle wheel of the tow vehicle using an ABS-sensor or ESC-sensor of the right side tow vehicle wheel; determining a first correspondence value indicating a correspondence between the number of complete rotations of the trailer wheel and the number of complete rotations of the left side tow vehicle wheel; determining a second correspondence value indicating a correspondence between the number of complete rotations of the trailer wheel and the number of complete rotations of the right side tow vehicle wheel; and determining a left side installation position of the trailer wheel, when the first correspondence value is larger than the second correspondence value, or determining a right side installation position of the trailer wheel, when the second correspondence value is larger than the first correspondence value.

Aspects of the present application relate to the idea that although a trailer does not have an ABS-sensor or ESC-sensor connected to the trailer wheel, it does more and more often include wheel electronics such as acceleration sensors connected to the trailer wheel. Aspects of the present application are partially based on the idea that not only ABS- or ESC-sensors, but also an acceleration sensor attached to the trailer wheel can determine a number of complete rotations of the trailer wheel. This number of complete rotations of the trailer wheel can then be compared with the number of complete rotations of a left side tow vehicle wheel and a right side tow vehicle wheel as determined by the ABS- or ESC-sensor usually attached to the tow vehicle wheels of the tow vehicle. Aspects of the present application relate to the idea that the installation position of the trailer wheel is very likely on that side, where a correspondence value between the number of complete rotations of the trailer wheel and the number of complete rotations of the respective side tow vehicle wheel is larger. By using this idea, wheel localization methods relying only on ABS- or ESC-sensors, can be expanded to trailer wheels where there is no ABS- or ESC-sensor attached.

According to an aspect of an embodiment, the acceleration sensor of the trailer wheel is installed within a tire pressure monitoring system of the trailer wheel. The tire pressure monitoring system can be a TPMS sensor of the trailer wheel. Nowadays, even trailer wheels usually have a TPMS sensor on board. The TPMS senor usually includes an acceleration sensor, for example to determine various wheel specific data such as large or the like. The acceleration sensor of the TPMS sensor is also capable of determining the number of complete rotations of the trailer wheel. Thus, the already built-in acceleration sensor of the TPMS sensor can be used to determine the number of complete rotations of the trailer wheel to determine the left-or-right side installation position of the trailer wheel.

According to an aspect of an embodiment, the first correspondence value is determined based on a difference between the number of complete rotations of the trailer wheel and the number of complete rotations of the left side tow vehicle wheel, and/or the second correspondence value is determined based on a difference between the number of complete rotations of the trailer wheel and the number of complete rotations of the right side tow vehicle wheel. In this embodiment, the first and/or second correspondence value can be determined based on a very simple straight forward mathematical operation. This is a quick and robust way of calculating the first and/or a second correspondence value. The correspondence value is, of course, higher, when the difference between the number of complete rotations of the trailer wheel and the number of complete rotations of the respective vehicle wheel is magnitude-wise smaller. Thus, if, for example, the initially unknown trailer wheel shows a number of complete rotations of, for example, 7 during the predefined time interval, and the left side tow vehicle wheel shows a number of complete rotations of, for example, 8 during the same predefined time interval, whereas the right side tow vehicle wheel shows a number of complete rotations of, for example, 10 during the same predefined time interval. Then, the likelihood of the trailer wheel being installed on a left side is higher than on a right side.

In order to improve the robustness of the determination of the left-or-right side installation position of the trailer wheel, according to an aspect of an embodiment, it is possible, that the first correspondence value is determined based on a correlation between a first signal indicating the number of complete rotations of the trailer wheel and a second signal indicating the number of complete rotations of the left side tow vehicle wheel, and/or the second correspondence value is determined based on a correlation between the first signal indicating the number of complete rotations of the trailer wheel and a third signal indicating the number of complete rotations of the right side tow vehicle wheel. The signals can be sensor signals as determined by the respective sensors. For example, the first signal can be any kind of signal as determined by the acceleration sensor of the trailer wheel. Likewise, the second and third signal can be any kind of signal as determined by the respective ABS- or ESC-sensor of the respective left or right side tow vehicle wheel. A correlation between the respective signals can be, for example, a cross-correlation between the first and second signal and/or a cross-correlation between the first and third signal at discrete time intervals within the predetermined time interval.

Usually, sensor signals from the acceleration and ABS- or ESC-sensors are readily available. These sensor signals only need to be processed accordingly in order to determine the first and/or second correspondence value. With this way of determining the first and/or second correspondence value, a straight forward and more robust way of determining the left-or-right installation position of the trailer wheel is possible.

According to an aspect of an embodiment, the determining is performed by an apparatus installed in or contained by the tow vehicle. The apparatus is configured to receive information from an acceleration sensor (16) of a trailer wheel (14), and receive information from the ABS-sensors or ESC-sensors (22) of the tow vehicle wheels (44), and to determine the installation position of at least one of the trailer wheels (14).

BRIEF DESCRIPTION OF THE DRAWINGS

Exemplary embodiments of the present application are described by the accompanying drawings, which are Incorporated herein and constitute a part of the specification, in which.

Within this disclosure, the same reference numerals refer to the same components.

DETAILED DESCRIPTION

Figure 1:
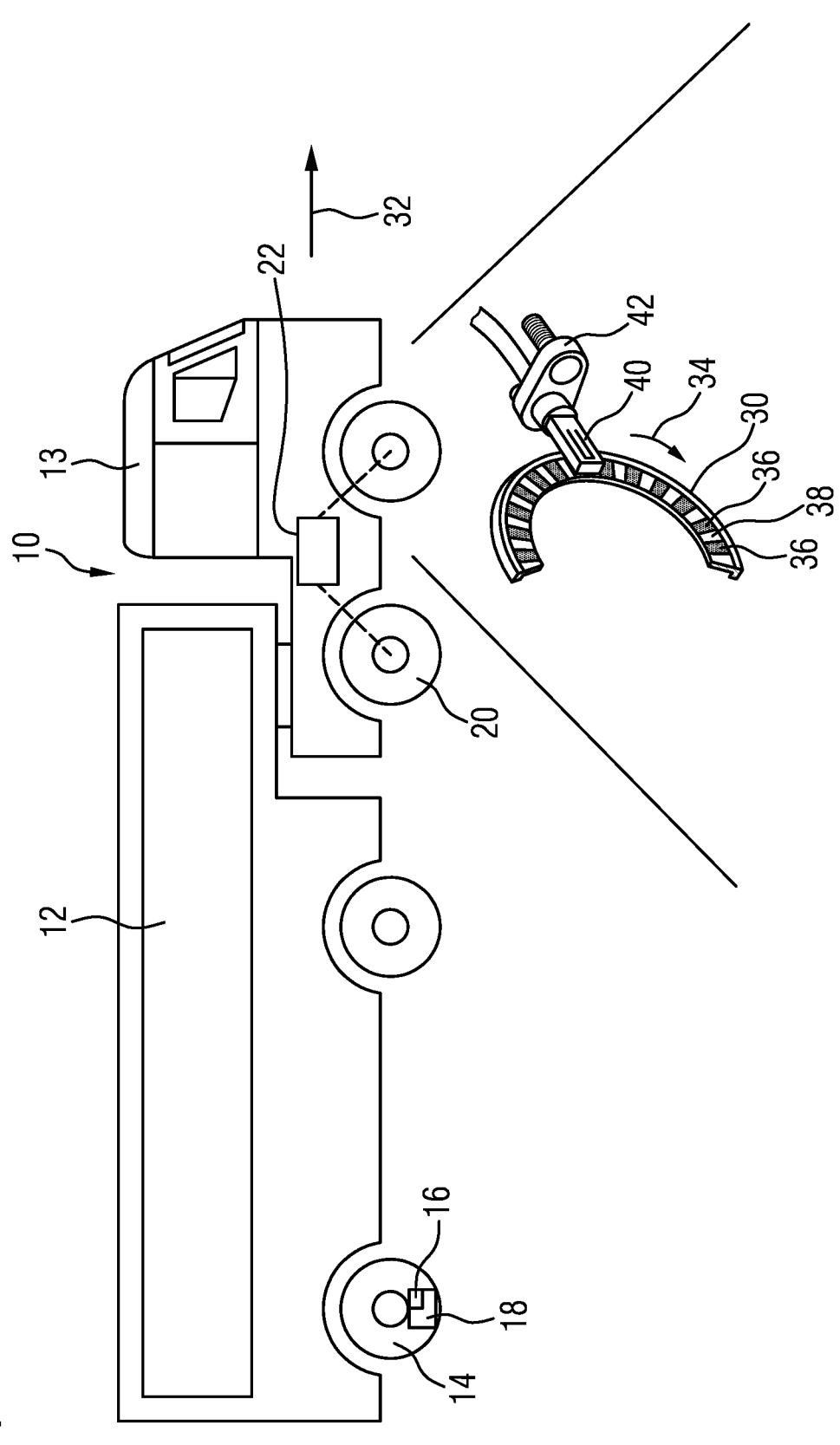
FIG. 1 is a schematic side view of a trailer-tow vehicle-truck having an ABS- or ESC-sensor connected to the tow vehicle wheels and an acceleration sensor connected to a trailer wheel, according to an embodiment.

Referring to FIG. 1, a trailer-tow vehicle-truck 10 is shown. Truck 10 includes a trailer 12 connected to a tow vehicle or prime mover 13 using some kind of connection means as known to a person skilled in the art. Trailer 12 has one or more trailer wheels 14. The one or more trailer wheels 14 include a respective acceleration sensor 16. In the specific embodiment shown in FIG. 1, acceleration sensor 16 is part of a TPMS sensor 18 of trailer wheel 14. TPMS sensor 18 can provide wheel specific data of trailer wheel 14, such as temperature, pressure, large or other data of trailer wheel 14. For this, acceleration sensor 16 provides acceleration data specific of trailer wheel 14. Acceleration data of acceleration sensor 16 can be used to determine a number of complete rotations of trailer wheel 14 within a predetermined time interval, for example by tracking a time signal of acceleration sensor 16 and calculating from the time signal centrifugal and other forces to determine the number of complete rotations of trailer wheel 14.

As can be further seen in FIG. 1, tow vehicle 13 includes one or more tow vehicle wheels 20. Tow vehicle wheels 20 are connected to ABS- or ESC-sensor(s) 22 of tow vehicle 13. ABS- or ESC-sensor(s) 22 is/are able to determine the number of complete rotations of tow vehicle wheels 20 within a predefined time interval. For this, ABS- or ESC-sensor 22 includes a reference disc 30 for measuring a rotation speed and a rotation angle of a respective tow vehicle wheel 20. When tow vehicle 13 is driving along a driving direction 32, tow vehicle wheel 20 is turning and thus reference disc 30 assigned to the respective tow vehicle wheel 20 is turning as well, as indicated by arrow 34. For this, reference disc 30 is, for example, permanently connected to an axis of rotation of tow vehicle wheel 20.

Reference disc 30 has a certain number of separate segments 36 which can be used for determining the rotation angle, the rotation speed and also the number of complete rotations of tow vehicle wheel 20. For example, reference disc 30 may have 48 segments 36 which are separated from one another by an intermediate region 38. A sensor 40 is in mechanical, electrical or optical contact with reference disc 30 via a bracket 42. ABS- or ESC-sensor 22 may include an apparatus such as a control unit for evaluating the signal delivered by sensor 40. For example, the control unit of ABS- or ESC-sensor 22 can evaluate the signal produced by sensor 40. Sensor 40, for example, produces a pulse each time when there is a change between a segment 36 and an intermediate region 38. The control unit of ABS- or ESC-sensor 22 can evaluate and analyze this signal. Thus, for example, during a complete rotation of tow vehicle wheel 20, sensor 40 may produce a total of 96 pulses which the control unit then converts to 1 complete rotation of tow vehicle wheel 20. Likewise, during a predefined time interval, sensor 40 may produce a number of X pulses. From the number of X pulses, control unit then determines the number of complete rotations of tow vehicle wheel 20. Thus, ABS- or ESC-sensor(s) 22 can determine the number of complete rotations of the respective tow vehicle wheel 20 within a predefined time interval.

Figure 2:
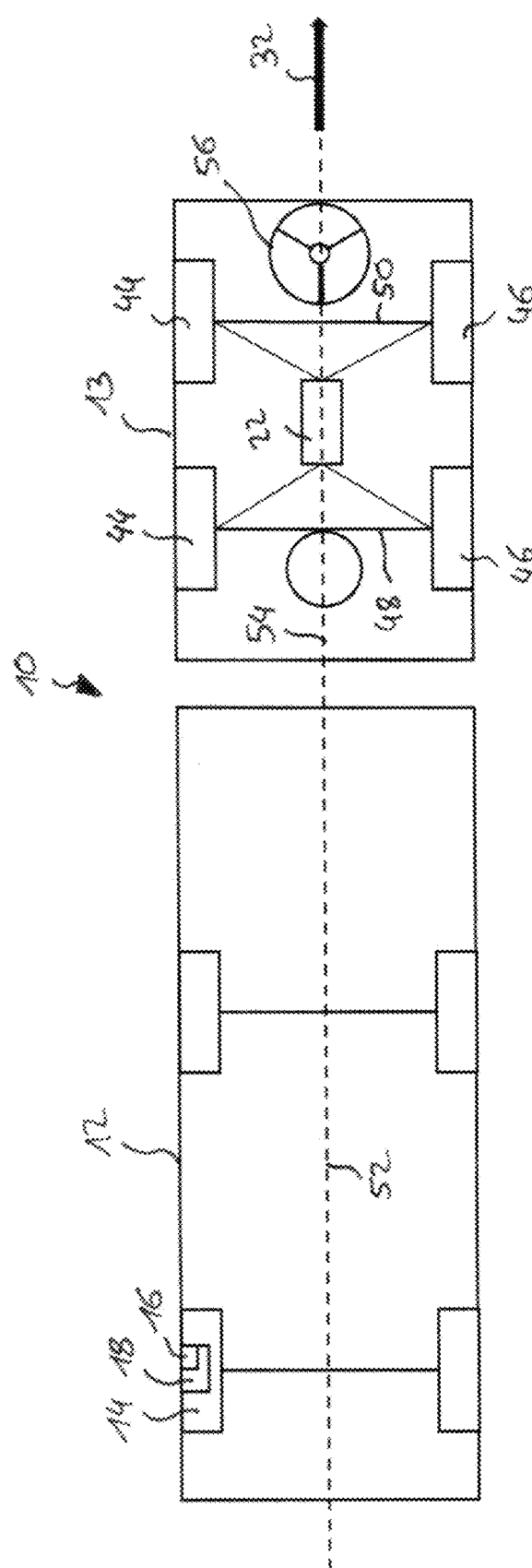
FIG. 2 is a schematic top view of the truck of FIG. 1, where the trailer and the tow vehicle are detached from one another for clarity reasons, according to an embodiment.

Referring now to FIG. 2, a schematic top view of truck 10 is shown. For clarity reasons, trailer 12 and tow vehicle 13 are disconnected. In the specific embodiment shown in FIG. 2, trailer 12 includes four wheels one of which being trailer vehicle 14. In this example, trailer wheel 14 is installed on a left side installation position with respect to the driving direction 32 of truck 10. Trailer wheel 14 is further equipped with TPMS sensor 18 having acceleration sensor 16.

As can be further seen in FIG. 2, tow vehicle 13 includes four tow vehicle wheels. A left side tow vehicle wheel is depicted having reference number 44. A right side tow vehicle wheel is depicted having reference number 46. As tow vehicle 13 includes two axes 48, 50, in principle, tow vehicle 13 may have two left side tow vehicle wheels 44 and two right side tow vehicle wheels 46. Left side tow vehicle wheels 44 and right side tow vehicle wheels 46 are connected to ABS- or ESC-sensor(s) 22.

As can be further seen, trailer 12 extends along a longitudinal axis 52 and tow vehicle 13 extends along another longitudinal axis 54. In the specific embodiment shown in FIG. 2, truck 10 drives straight, i.e. not around corners, so there is no angle between longitudinal axis 52 of trailer 12 and longitudinal axis 54 of tow vehicle 13.

Figure 5:
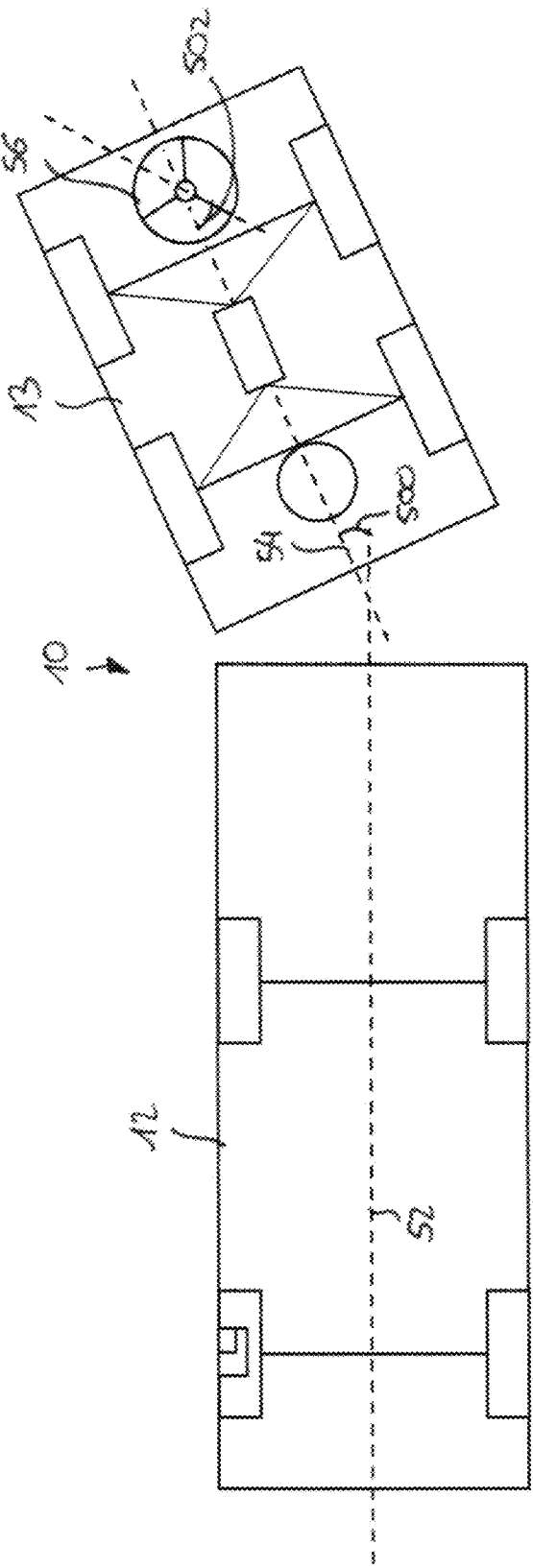
FIG. 5 is a schematic top view of the truck of FIG. 1 or 2 driving around a left corner with respect to a driving direction of the tow vehicle, according to an embodiment.

Tow vehicle 13 also includes a steering wheel 56 as known to a person skilled in the art, the turning of which changing the driving direction of tow vehicle 13 so that truck 10 drives around corners (see also FIG. 5).

Figure 3:
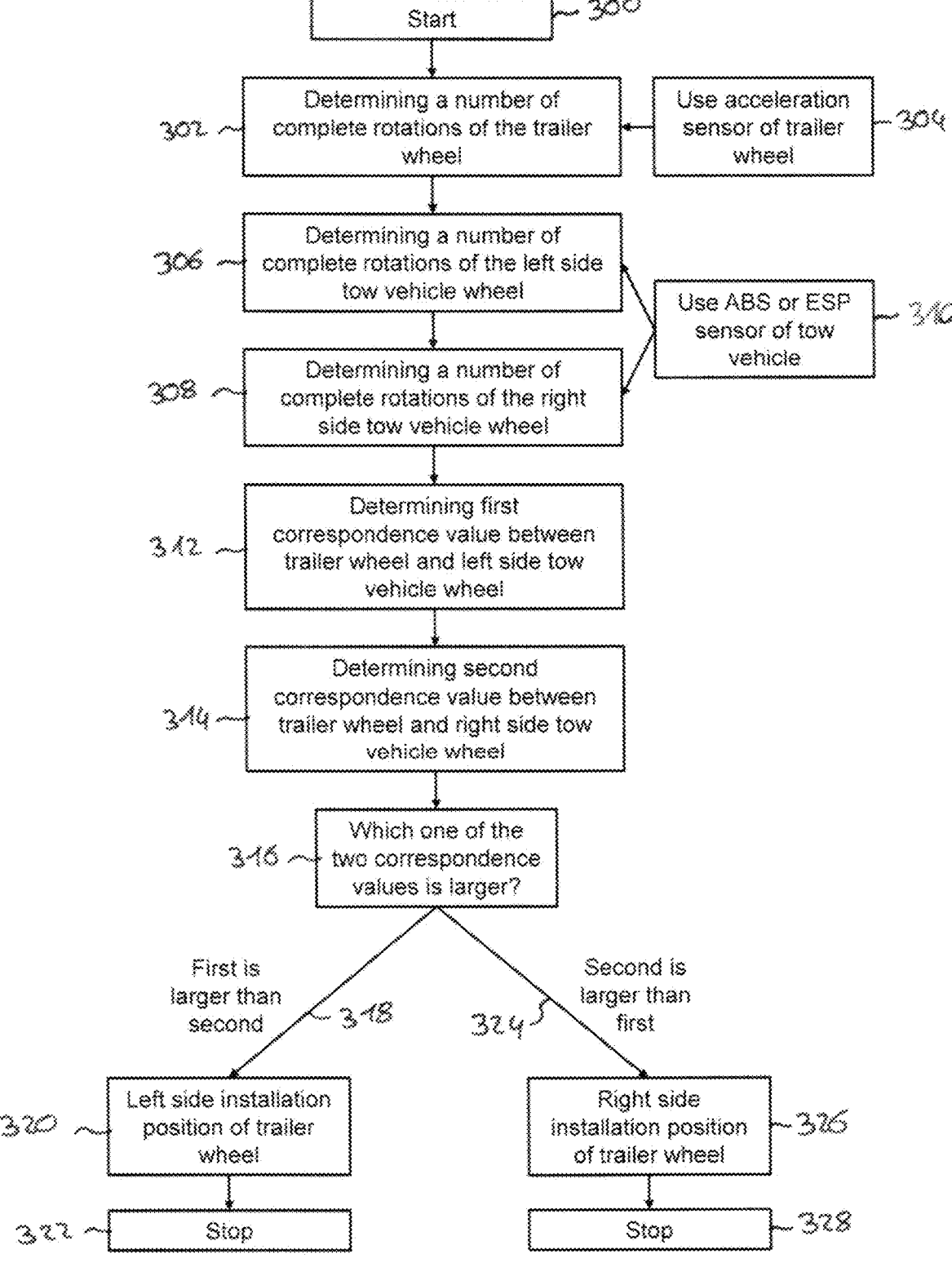
FIG. 3 is a flowchart of a method of determining a left-or-right side installation position of trailer wheel, according to an embodiment.

Referring now to FIG. 3, a schematic procedure of processing steps is shown in order to determine a left-or-right side installation position of trailer wheel 14.

The procedure starts with step 300.

In step 302, a number of complete rotations of trailer wheel 14 is determined within a predefined time interval. The number of complete rotations of trailer wheel 14 is determined using acceleration sensor 16, as indicated by box 304.

Next, in step 306, a number of complete rotations of left side tow vehicle wheel 44 is determined. Likewise, in step 308, a number of complete rotations of right side tow vehicle wheel 46 is determined. The number of complete rotations of left side tow vehicle wheel 44 and the number of complete rotations of right side tow vehicle wheel 46 are determined using ABS- or ESC-sensor(s) 22 of tow vehicle 13, as indicated by box 310.

Once the number of complete rotations of trailer wheel 14, left side tow vehicle wheel 44 and right side tow vehicle wheel 46 are determined, in next step 312, a first correspondence value is calculated. The first correspondence value indicates a correspondence between the number of complete rotations of trailer wheel 14 as determined using acceleration sensor 16 and the number of complete rotations of left side tow vehicle wheel 44 as determined using ABS- or ESC-sensor 22.

Likewise, in step 314 a second correspondence value is calculated. The second correspondence value indicates a correspondence between the number of complete rotations of trailer wheel 14 as determined using acceleration sensor 16 and the number of complete rotations of right side tow vehicle wheel 46 as determined using ABS- or ESC-sensor 22.

Next, in step 316, it is determined which one of the two correspondence values is larger. When the first correspondence value is larger than the second correspondence value (branch 318), it is determined in step 320 that trailer wheel 14 is installed on a left side with respect to driving direction 32. In other words, in step 320 a left side installation position of trailer wheel 14 (with respect to driving direction 32) is determined for trailer wheel 14. The procedure then stops in step 322.

When, however, the second correspondence value is larger than the first correspondence value (branch 324), it is determined in step 326 that trailer wheel 14 is installed on a right side with respect to driving direction 32. In other words, in step 326 a right side installation position of trailer wheel 14 (with respect to driving direction 32) is determined for trailer wheel 14. The procedure then stops in step 328.

If it cannot be determined which one of the two correspondence values is larger, the procedure may restart again and perform all the steps again, until it is determined whether trailer wheel 14 is installed on a left side or on a right side with respect to driving direction 32.

Figure 4:
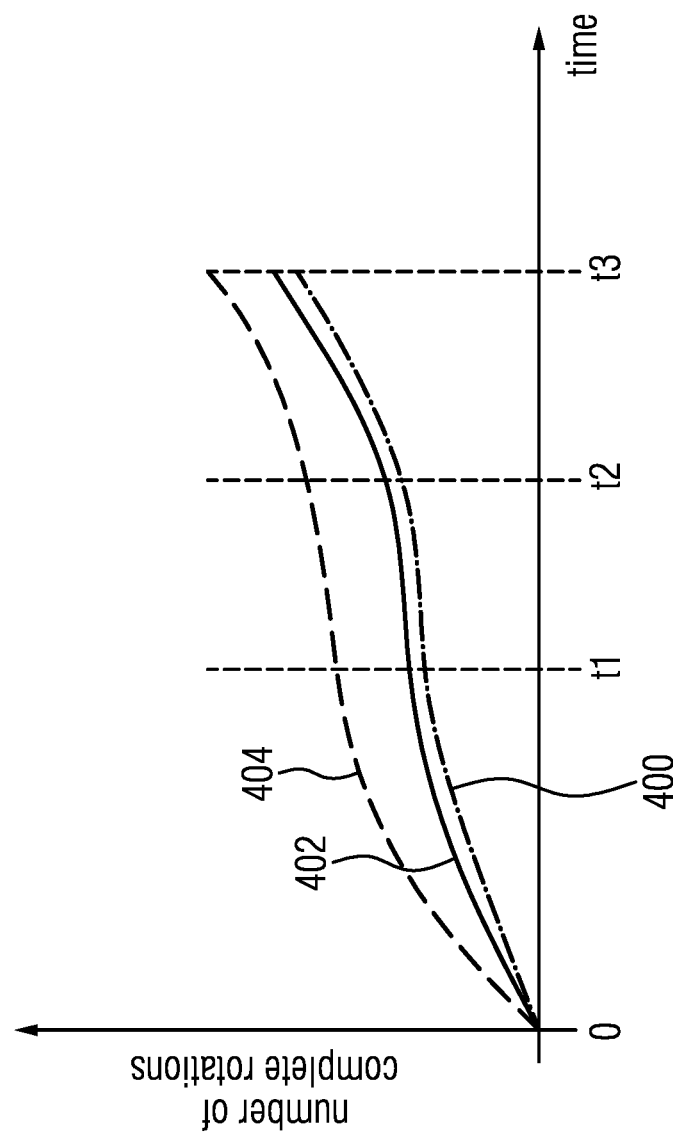
FIG. 4 is a schematic graph showing signals as determined within the predefined time internal for a trailer wheel, a left side tow vehicle wheel and a right side tow vehicle wheel, according to an embodiment.

Referring now to FIG. 4, a schematic graph showing the number of complete rotations of a trailer wheel, a left side tow vehicle wheel and a right side tow vehicle wheel over time. The graph schematically depicts three signals. A first signal 400 is a signal indicating the number of complete rotations over time for trailer wheel 14 using acceleration sensor 16. A second signal 402 is a signal indicating the number of complete rotations over time for left side tow vehicle wheel 44 using ABS- or ESC-sensor 22 for left side tow vehicle wheel 44. A third signal 404 is a signal indicating the number of complete rotations over time for right side tow vehicle wheel 46 using ABS- or ESC-sensor 22 for right side tow vehicle wheel 46.

As can be seen clearly in FIG. 4, signal 400 of trailer wheel 14 shows a higher correspondence to signal 402 of left side tow vehicle wheel 44 than to signal 404 of right side tow vehicle wheel 46. Correspondence between signal 400 and 402 can be expressed in terms of a first correspondence value. The first correspondence value can be determined, for example, based on a difference between signals 400 and 402, whereas smaller differences (magnitude-wise) result in higher first correspondence values. Likewise, correspondence between signal 400 and 404 can be expressed in terms of a second correspondence value. The second correspondence value can be determined based on the difference between signals 400 and 404, whereas smaller differences (magnitude-wise) result in higher second correspondence values.

These correspondence values can be calculated over time. It is not necessary, that these correspondence values are calculated over the entire time span of a predefined time interval. It may be possible, to calculate the correspondence values only over certain time intervals within the predefined time interval.

To further explain the graph of FIG. 4, as an example, the timeline of FIG. 4 is separated into three distinct time intervals. The first time interval stretches from time 0 to time equal to t1. The second time interval stretches from time equal to t1 to time equal to t2. The third time interval stretches from time equal to t2 to time equal to t3. The predefined time interval can be, for example, the time interval stretching from 0 to time equal to t3.

Within the first time interval, it can be seen that over time, the number of complete rotations of right side tow vehicle wheel 46 (signal 404) is significantly larger than the number of complete rotations of left side tow vehicle wheel 44 (signal 402). This difference between the number of complete rotations of right side tow vehicle wheel 46 and left side tow vehicle wheel 44 indicates that tow vehicle 13 drives around a left corner. The reason for this is, when tow vehicle 13 drives around a left corner, within the same period of time, the outer wheel of tow vehicle 13, i.e. in this example the right side tow vehicle wheel 46, has to turn more often than the inner wheel of tow vehicle 13, i.e. in this example left side tow vehicle wheel 44. As the number of complete rotations of trailer wheel 14 (signal 400) over time is more similar to the number of complete rotations of left side tow vehicle wheel 44 (signal 402), a left side installation position of trailer wheel 14 can be determined.

Within the second time interval, over time, a difference between signals 402 and 404 remains almost unchanged. This indicates that tow vehicle 13 does not drive around a corner but drives almost straight. In the second time interval, therefore, it may be difficult to determine the installation position of trailer wheel 14. Thus, it is possible, that the determination of first or second correspondence value within the second time interval is neglected, to not make any unforeseeable mistake during the determination of the left-or-right installation position of trailer wheel 14.

Within the third time interval, however, it can be again clearly seen that over time, the number of complete rotations of left side tow vehicle wheel 44 (signal 402) increases more than the number of complete rotations of right side tow vehicle wheel 46 (signal 404). Thus, based on the explanation given above with respect to the left corner, tow vehicle 13 now drives around a right corner, because the inner wheel of tow vehicle 13, i.e. in this example the right side tow vehicle wheel 46, has to turn less often than the outer wheel of tow vehicle 13, i.e. in this example left side tow vehicle wheel 44. Again, as the number of complete rotations of trailer wheel 14 (signal 400) over time is more similar to the number of complete rotations of left side tow vehicle wheel 44 (signal 402) than to right side tow vehicle wheel 46 (signal 404), a left side installation position of trailer wheel 14 can be determined.

It is possible, to calculate first and second correspondence values only for the first time interval and the third time interval and neglect the calculation of first and second correspondence values for the second time interval, to increase the accuracy of determining a left-or-right side installation position of trailer wheel 14.

Referring now to FIG. 5, another schematic top view of truck 10 is shown. In the particular embodiment shown in FIG. 5, truck 10 drives around a left corner. As a result, there is an angle 500 between longitudinal axis 52 of trailer 12 and longitudinal axis 54 of tow vehicle 13. Angle 500 may be the smaller one of the two angles between axes 52, 54. Angle 500 can also be determined based on a steering angle 502 of steering wheel 56 of tow vehicle 13. Steering angle 502 can be an indication of angle 500 between longitudinal axes 52, 54. By using angle 500 or steering angle 502, the time intervals within the predefined time interval during which a calculation of first and second correspondence values results in a more robust left-or-right side installation position determination, can easily be flagged. For example, when angle 500 or steering angle 502 are above a respective predetermined threshold angle, it can be flagged that first and second correspondence values are to be determined. Whereas, when angle 500 or steering angle 502 are below the respective threshold angle, it can be flagged that first and second correspondence values are not to be determined.

Figure 6:
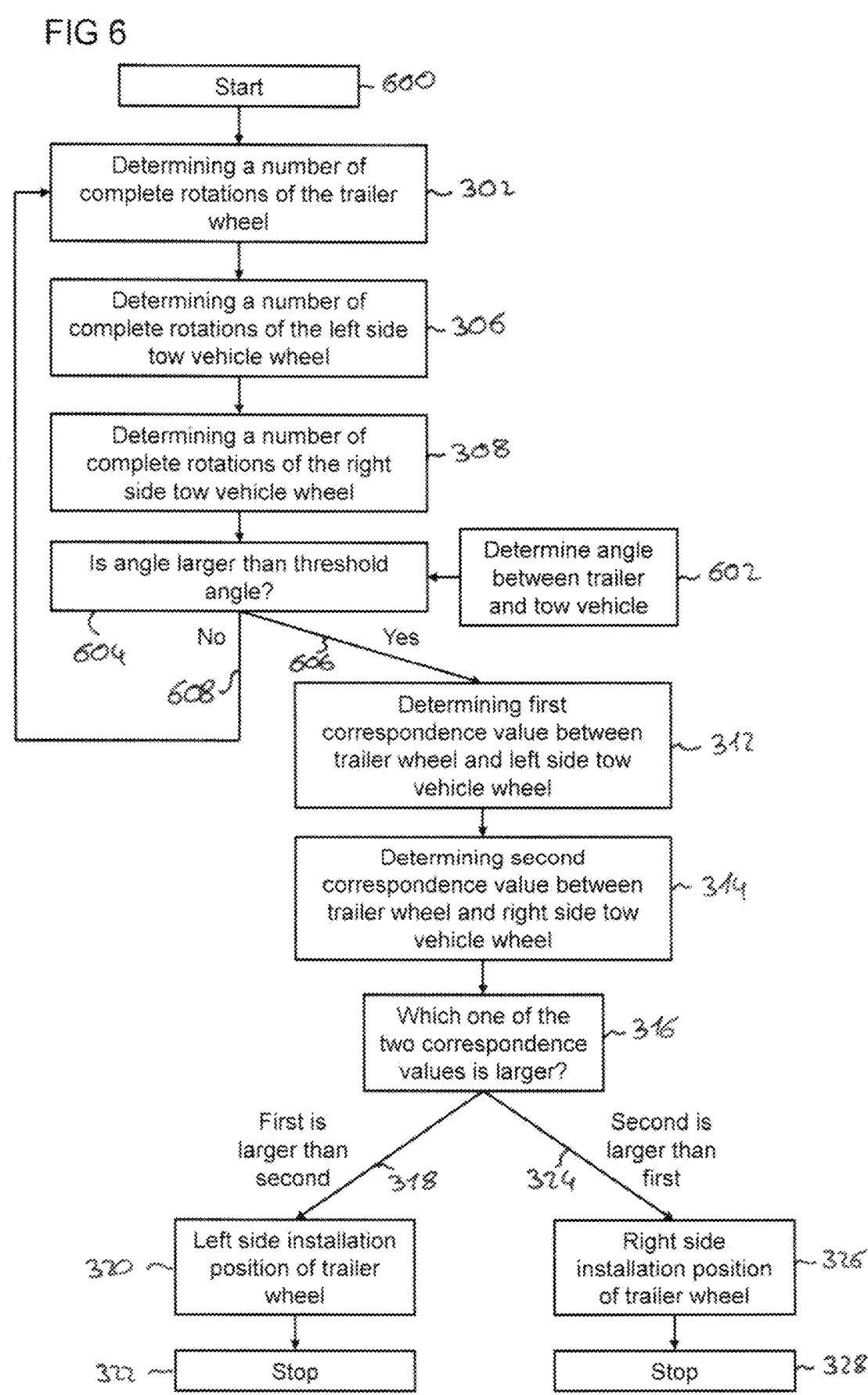
FIG. 6 is a flowchart of a method of determining a left-or-right side installation position of trailer wheel, according to an embodiment.

Referring now to FIG. 6, a schematic procedure of processing steps taking into account angle 500 or steering angle 502 is shown.

The procedure starts in step 600.

Next, the procedure moves on to steps 302, 306 and 308 of the procedure already discussed in connection with FIG.

3. Again, during step 302 acceleration sensor 16 is used, and during steps 306 and 308 ABS- or ESC-sensor(s) 22 is(are) used.

The procedure of FIG. 6 distinguishes from the procedure of FIG. 3 in that in step 602, an angle between trailer 12 and tow vehicle 13 is determined. This angle can be angle 500 between longitudinal axes 52, 54. Angle 500 can be determined based on steering angle 502 as described earlier on.

Next, in step 604 it is determined whether angle 500 is larger than a predefined threshold angle. If this is the case (branch 606), the procedure then moves on to steps 312 up to 328 as already explained with reference to FIG. 3. In other words, only when angle 500 is larger than the threshold angle 500, first and second correspondence values are determined to determine a left-or-right side installation position of trailer wheel 14.

If, however, angle 500 is not larger than the predefined threshold angle (branch 608), then the procedure jumps back to step 302 and starts over again. This way, it is possible to determine the first and second correspondence value more accurately. As a result, the procedure of determining a left-or-right side installation position of trailer wheel 14 is more accurate and less prone to errors.

The invention claimed is:

1. A method of determining a left side installation position of a trailer wheel of a trailer or a right side installation position of a trailer wheel of the trailer, the trailer being connected to a tow vehicle, the method comprising:

within a time interval, determining a number of rotations of the trailer wheel using an acceleration sensor of the trailer wheel;

within the time interval, determining a number of rotations of a left side tow vehicle wheel of the tow vehicle using an anti-lock brakes (ABS) sensor or electronic stability control (ESC) sensor of the left side tow vehicle wheel;

within the time interval, determining a number of rotations of a right side tow vehicle wheel of the tow vehicle using an ABS sensor or ESC sensor of the right side tow vehicle wheel;

transmitting the determined number of rotations of the trailer wheel, the determined number of rotations of the left side tow vehicle wheel and the determined number of rotations of the right side tow vehicle wheel to a receiver located in the tow vehicle configured to monitor wheel-specific data of the trailer wheel;

determining, by the receiver, an angle between a longitudinal axis of the trailer and a longitudinal axis of the tow vehicle during the time interval;

determining, by the receiver, a first correspondence between the number of rotations of the trailer wheel and the number of rotations of the left side tow vehicle wheel when the angle between the longitudinal axis of the trailer and the longitudinal axis of the tow vehicle is above a predetermined threshold angle;

determining, by the receiver, a second correspondence between the number of rotations of the trailer wheel and the number of rotations of the right side tow vehicle wheel when the angle between the longitudinal axis of the trailer and the longitudinal axis of the tow vehicle is above the predetermined threshold angle;

determining, by the receiver, the left side installation position of the trailer wheel or the right side installation position of the trailer wheel based on the first correspondence and the second correspondence; and updating the wheel-specific data of the trailer wheel in the receiver based on the determination of the left side installation position of the trailer wheel or the right side installation position of the trailer wheel.

2. The method of claim 1, wherein determining the first correspondence comprises determining the first correspondence based on a difference between the number of rotations of the trailer wheel and the number of rotations of the left side tow vehicle wheel, and wherein determining the second correspondence comprises determining the second correspondence based on a difference between the number of rotations of the trailer wheel and the number of rotations of the right side tow vehicle wheel.

3. The method of claim 1, wherein determining the first correspondence comprises determining the first correspondence based on a correlation between a first signal indicating the number of rotations of the trailer wheel and a second signal indicating the number of rotations of the left side tow vehicle wheel, and wherein determining the second correspondence comprises determining the second correspondence based on a correlation between the first signal indicating the number of rotations of the trailer wheel and a third signal indicating the number of rotations of the right side tow vehicle wheel.

4. The method of claim 1, wherein the angle is determined based on a steering angle of a steering wheel of the tow vehicle.

5. The method of claim 1, wherein determining the left side installation position of the trailer wheel or the right side installation position of the trailer wheel comprises:

determining the left side installation position of the trailer wheel when the first correspondence is larger than the second correspondence; and determining the right side installation position of the trailer wheel when the second correspondence is larger than the first correspondence.

6. The method of claim 1, wherein the trailer wheel does not have an ABS sensor or an ESC sensor.

7. A system for determining a left side installation position of a trailer wheel of a trailer connected to a tow vehicle or a right side installation position of the trailer wheel, the system comprising:

an acceleration sensor of the trailer wheel configured to determine a number of rotations of the trailer wheel within a time interval;

a left side sensor of a left side tow vehicle wheel of the tow vehicle configured to determine a number of rotations of the left side tow vehicle wheel within the time interval;

a right side sensor of a right side tow vehicle wheel of the tow vehicle configured to determine a number of rotations of the right side tow vehicle wheel within the time interval; and a receiver located in the tow vehicle configured to monitor wheel-specific data of the trailer wheel, the receiver having a processor configured to receive the determined number of rotations of the trailer wheel, the determined number of rotations of the left side tow vehicle wheel and the determined number of rotations of the right side tow vehicle, determine an angle between a longitudinal axis of the trailer and a longitudinal axis of the tow vehicle during the time interval, determine a first correspondence between the number of rotations of the trailer wheel and the number of rotations of the left side tow vehicle wheel when the angle between the longitudinal axis of the trailer and the longitudinal axis of the tow vehicle is above a threshold angle, determine a second correspondence between the number of rotations of the trailer wheel and the number of rotations of the right side tow vehicle wheel when the angle between the longitudinal axis of the trailer and the longitudinal axis of the tow vehicle is above the threshold angle, determine the left side installation position of the trailer wheel or the right side installation position of the trailer wheel based on the first correspondence and the second correspondence, and update the wheel-specific data of the trailer wheel in the receiver based on the determination of the left side installation position of the trailer wheel or the right side installation position of the trailer wheel.

8. The system of claim 7, wherein the acceleration sensor is installed within a tire pressure monitoring system (TPMS) sensor of the trailer wheel.

9. The system of claim 7, wherein the processor is configured to determine the left side installation position of the trailer wheel when the first correspondence is larger than the second correspondence and determine the right side installation position of the trailer wheel when the second correspondence is larger than the first correspondence.

10. The system of claim 7, wherein the left side sensor of the left side tow vehicle wheel of the tow vehicle and the right side sensor of the right side tow vehicle is one or more of an anti-lock brakes (ABS) sensor or an electronic stability control (ESC) sensor.

11. The system of claim 10, wherein the trailer wheel does not have an ABS sensor or an ESC sensor.

* * * * *